(12) United States Patent
Ogle

(10) Patent No.: US 7,210,010 B2
(45) Date of Patent: Apr. 24, 2007

(54) EFFICIENT SYSTEM AND METHOD FOR UPDATING A MEMORY DEVICE

(75) Inventor: Andrew J. Ogle, Amersham (GB)

(73) Assignee: Insignia Solutions plc, Campbell, CA (US)

(*) Notice: Subject to any disclaimer, the term of this patent is extended or adjusted under 35 U.S.C. 154(b) by 353 days.

(21) Appl. No.: 10/676,483

(22) Filed: Sep. 30, 2003

(65) Prior Publication Data
US 2004/0088473 A1 May 6, 2004

Related U.S. Application Data

(60) Provisional application No. 60/415,158, filed on Sep. 30, 2002, provisional application No. 60/415,157, filed on Sep. 30, 2002, provisional application No. 60/415,156, filed on Sep. 30, 2002.

(51) Int. Cl.
G06F 12/00 (2006.01)
G06F 12/16 (2006.01)

(52) U.S. Cl. .................. 711/162; 711/161; 711/100; 711/156; 717/168; 707/204

(58) Field of Classification Search .................. None
See application file for complete search history.

(56) References Cited

U.S. PATENT DOCUMENTS

| | | | | |
|---|---|---|---|---|
| 4,654,819 A | * | 3/1987 | Stiffler et al. ............ 711/162 |
| 5,414,839 A | * | 5/1995 | Joshi .......................... 707/8 |
| 5,432,922 A | * | 7/1995 | Polyzois et al. ............ 714/6 |
| 5,832,520 A | * | 11/1998 | Miller ...................... 707/203 |
| 5,845,313 A | * | 12/1998 | Estakhri et al. ........... 711/103 |
| 5,943,675 A | * | 8/1999 | Keith et al. ............... 707/201 |
| 6,425,125 B1 | * | 7/2002 | Fries et al. ................ 717/168 |
| 6,542,906 B2 | * | 4/2003 | Korn ......................... 707/203 |
| 6,671,757 B1 | * | 12/2003 | Multer et al. ............. 710/100 |
| 6,775,423 B2 | * | 8/2004 | Kulkarni et al. .......... 382/305 |
| 6,925,467 B2 | * | 8/2005 | Gu et al. .................... 707/101 |

\* cited by examiner

*Primary Examiner*—Matthew Kim
*Assistant Examiner*—Michael Krofcheck
(74) *Attorney, Agent, or Firm*—Paul O. Livesay; Smyrski Law Group, A P.C.

(57) ABSTRACT

A system and method for updating a binary image stored across a block-structured memory device, such as a flash memory device. From comparison of original and new images, an update package is generated which includes an encoded instruction set comprising COPY and ADD operations instructing the copying of source data from locations in the memory device and adding other data provided in the update package. The instruction set comprises SETBLOCK operations that direct updating of the memory blocks in an order that optimizes the COPY and ADD operations required and resulting update package size. The instruction set further comprises SETCOPYOFFSET operations to toggle between copy-offset modes thereby allowing for improved efficient encoding of COPY operations. The update package further includes an array of status bits corresponding to the memory blocks to be updated, thereby allowing for reliable restarting of the update process following power loss or other interruption.

9 Claims, 9 Drawing Sheets

EFFICIENT SYSTEM AND METHOD FOR UPDATING A MEMORY DEVICE

CROSS-REFERENCES TO RELATED APPLICATIONS

This application claims priority from U.S. provisional applications Ser. Nos. 60/415,156, 60/415,157, and 60/415,158, all filed Sep. 30, 2002, the disclosures of which are each incorporated herein by reference.

FIELD OF THE INVENTION

The present invention relates generally to the field of computer systems, and more specifically to systems and methods for updating a data image stored in a non-volatile memory device, such as a flash memory. In particular, but not exclusively, the present invention pertains to generating and applying an update package to convert an original first binary image into a new second binary image where the update package is an efficient set of instructions based on the differences between the two images.

BACKGROUND OF THE INVENTION

Recent years have seen the rapid advancement and proliferation of electronic devices, which devices often require the updating of the resident firmware, operating code, applications or other software loaded thereon, collectively, "binary images", or simply "images". Moreover, installing and updating of such binary images is becoming more routine where advancements applicable to a particular device far outpace the rate at which it is desirable to retire the unit and replace it with an entirely new unit.

Moreover, for many devices for which updating the binary image is desirable, these same devices may be remotely located and it is not practical for many reasons to return or collect the device in order that it can be directly connected to a host updating machine or system.

Additionally, with limited memory on the device itself, whether it be a mobile phone, PDA, pager or any other variety of small form factor portable device, delivery of an entire new image is often infeasible due to the capacity limitations of the device. Also, even if the device is not memory or other resource constrained, and thus not limiting the size or application process for installing an update, delivery of a complete new image may still be infeasible because the connection used by the device may be intermittent and/or of a limited capacity.

Also, in applying an update to install a new image, it is not uncommon for power loss or other interruptions to the subject device to occur which leads to failure of the installation. This may result in the installation process having to begin again from the start, or worse, leaving a device disabled or wholly inoperable due to a partial install from which it cannot recover or reinitiate.

Accordingly there is a need for an efficient, effective and reliable system and method for providing an update to a device that does not require the unit to be returned to a service center for update and instead uses an update package that can modify the binary image in-situ, and is significantly smaller than the full image. And, there exists need for a complimentary mechanism or technique to allow for recovery and continued application of an update to such device, even when being updated remotely and without access to a host update or boot rescue system.

A known manner in reducing the size of a new image update is to use a differencing algorithm or binary differencing engine (BDE) which compares the current or existing binary image with the new binary image to produce a list of differences. Such differences, in a general sense, are typically output or expressed as sequences or sets of ADD and COPY operations such that the new image can be created by cobbling together binary strings copied from image sequences resident on the device in the original image and interlacing them with binary sequences from the new image for which a suitable copy string was not available in the old image. The ADD operation specifies a list of bytes that must be copied into the new image at the current location, and the COPY operation specifies a number of bytes to be copied from a given location in the original image to the current update location in the new image.

The efficiency of the high-level BDE can have significant effect on how much of the update can be expressed as COPY operations and how much using ADD operations; in general terms, the more of the new image that can be expressed as COPY operations the smaller the resultant update package will be. Quite naturally, at one extreme, a single add operation comprising the entire new image is too large and does nothing to reduce the size of the update package. Similarly, any new image can be made entirely from copy operations if the copy sequences are short enough, say, ultimately, copying sequences of single bits; however, at that extreme the required number of total operations is prohibitively high and, again, does not benefit the reducing the size of the update package. Moreover, even given an efficient BDE, a space-efficient encoding of the operations is still required to produce small update packages.

The need therefore is for a system that optimizes the size and number of operations to find the most effective and minimized update package size for any given original image and new image.

SUMMARY OF THE INVENTION

The present invention has as an object to update a binary image held in non-volatile memory on a device such as a mobile phone by application of an update package to upgrade the image in-situ, rather than have to supply a complete copy of the new image. With the update package delivered to the device, the image can be updated by the device itself without need of a potentially expensive general recall. Thus it is a further object of the invention to be able to add new functionality or resolve problems found after deployment of a device, such as a mobile phone, without being recalled by a manufacturer for modification at a service centre. The ability for the device to reliably apply the update itself and allowing the update package to be provided via over-the-air (OTA) delivery, thus removing the costs associated with a major recall, is a further object of the invention.

A typical embodiment of this invention would be for updating of the flash memory image in a mobile phone where the update package has been delivered to the phone over-the-air (OTA) and is being applied to the flash memory without the subscriber returning the phone to a service centre for update. In this environment the update must complete reliably even though the battery may discharge during the update, or the subscriber may simply turn-off the phone.

Thus, a further and more specific object of the invention is a substantially reduced size of a update package acceptable for OTA delivery, particularly when it would be impractical for a complete copy of the new image to be delivered due to constraints in the communications network utilized or it would also be infeasible due to memory or other performance constraints on the target device. Accordingly, yet a further object of the invention is a space efficient storage of an update package expressing the difference between an original binary image and an updated version of that image. These small update packages may feasibly be transmitted over low speed communications links (e.g. a GSM network), and stored on devices with limited available memory (e.g. a mobile phone).

Moreover, another object of the inventions is to allow for an update package that can be used to perform an in-situ upgrade of a binary image held in flash memory without use of external re-flashing hardware.

And yet a further object of the invention is to allow for reliable flash memory updates within devices that do not have a guaranteed power supply, e.g. mobile phones, PDAs, etc., and without recourse to external power supplies or dedicated additional re-flashing hardware.

As will be evident through further understanding of the invention, any application using binary differencing techniques to store multiple images by use of an original and update packages (rather than simply the raw images themselves) would potentially benefit from reduced storage requirements. This method of generating update packages could be applied to any device using conventional block-structured non-volatile memory such as flash memory; i.e., those with limited additional memory for storage of new images prior to update would benefit by requiring only the space for the much smaller update package to be held instead.

BRIEF DESCRIPTIONS OF THE DRAWINGS

DETAILED DESCRIPTION OF THE INVENTION

The present invention will be illustrated below in an exemplary wireless communications system utilizing mobile handsets containing flash memory devices; however, the present invention is applicable to any device using a block-structured or partitioned memory device that may need its memory image updated in a reliable way when working in a standalone configuration, and which is perhaps also possible not to have any guarantee that power to the device will not be interrupted during the update. Although particularly well-suited for use in conjunction with a wireless communications system and for updating handsets used in such a system, the invention is not limited to use with such system or types of mobile devices. Use of the term "mobile handset" is in no way intended to limit the application of the present invention from use with a much broader class of client devices which may be mobile or fixed, and which may be the form of a telephone handset but may also be of any number of other form factors or varieties of devices. As such, the term "client device" as used herein means the broadest description possible of a class of computing devices that can be connected to a network (whether by fixed, wireless, intermittent, removably connected or other connection) and which the updating techniques detailed herein may be applied, which includes, without limitation, mobile handsets, PDAs, pagers, personal computers, printers and other peripheral devices. Additionally, the term "communications network" or "communications system" as used herein is used in it most expansive sense and applies to any communications system through which an update package or other information may be transferred to and from a client device, whether by static, active, dynamic communications protocols or otherwise, and includes, without limitation, anything from a single client device connected by fixed wire to a host server or computer system, or to a LAN, WAN, wireless communication networks, conventional telephony, the Internet, etc. Accordingly, the disclosed updating techniques may be used in any number or type or combination of communications systems and client devices having block-structured non-volatile memory devices in which it is desirable to reduce the size of the update package, reduce the number of update operations or otherwise provide more efficient updating of the binary image stored in the device. As used herein "stored" "saved" "reprogrammed" and similar terms all refer to the same process of storing a binary image in a memory device in accordance with the techniques for storing associated with the particular memory device, whether it be non-volatile flash memory, volatile RAM or otherwise, unless specifically described otherwise.

Figure 1:
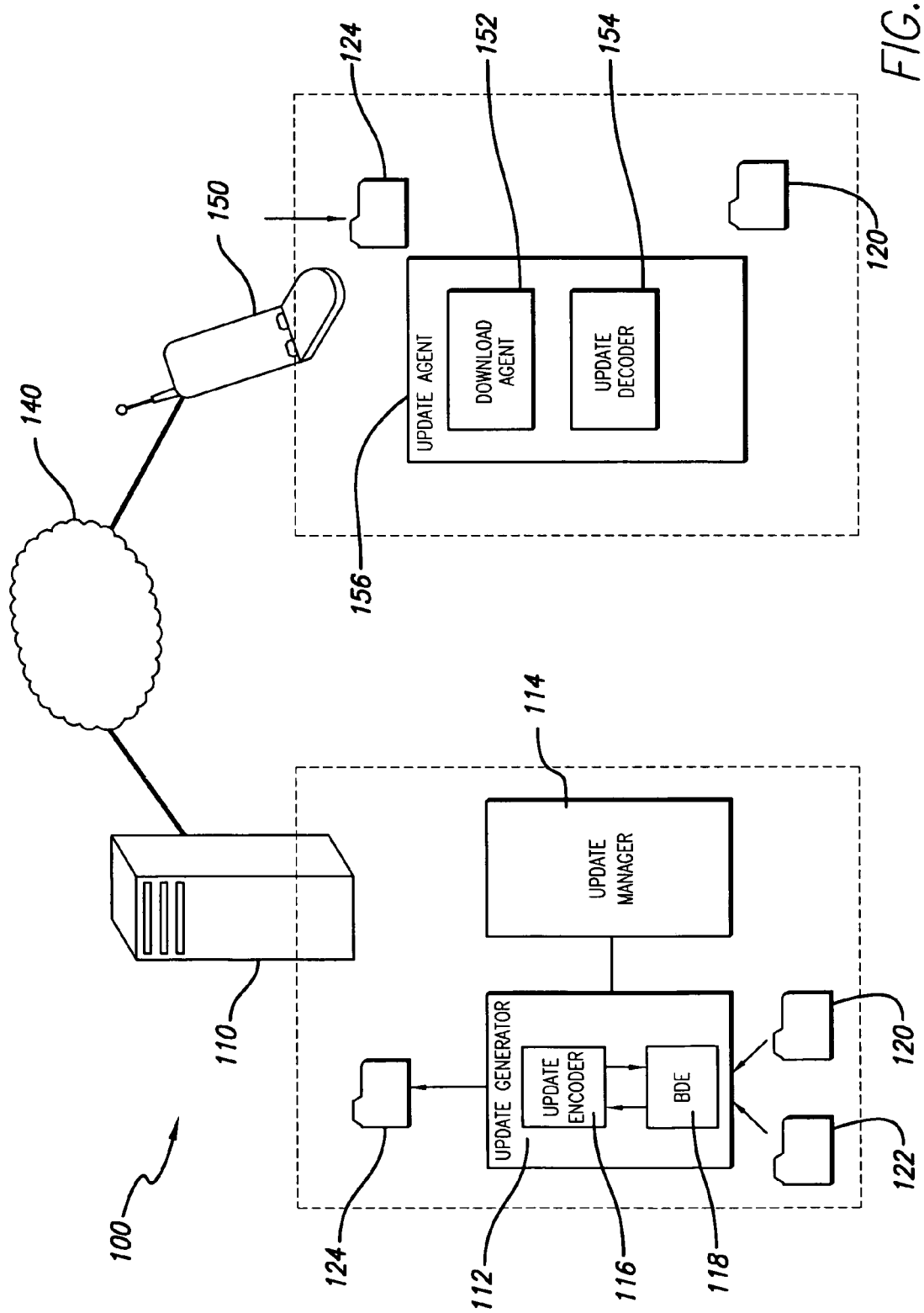
FIG. 1 is a schematic illustration of an updating system of the present invention.

FIG. 1 shows an update system 100 in accordance with an illustrative embodiment of the invention. The system 100 includes an update server 110 connected to a client device 150 through a communications network 140. Though shown singularly, client device 150 is representative of any number of devices that may comprise a homogeneous or heterogeneous population of client devices capable of being updated by update system 100. Each such client device 150 contains a current original data image 120 constituting the software or operating code to be updated, which original data image 120 is stored in non-volatile memory 210 (not shown; see FIG. 2) of client device 150. Client device 150 also contains an update agent 156 that is comprised of download agent 152 for communicating with update server 110 and receiving update package 124 though communications network 140. Update agent 156 is further comprised of update decoder 154 that interprets and applies the update instruction set of update package 124 in order to convert original data image 120 into a new data image 122. Though shown schematically as two separate elements, download agent 152 and update decoder 154 may be parts of the same application or software, be embedded firmware or specialized hardware such as an application specific integrated circuit (ASIC), which variations and possibilities for implementing the functionalities of download agent 152 and update decoder 154 will be obvious to one skilled in the art.

The update server 110 contains, generally, an update generator 112 and update manager 114. While depicted as a single element, update server 110 may alternatively be comprised of a server array or set of distributed computing devices that fulfill the purposes of update server 110. Update generator 112 creates update packages 124 through the use of a binary differencing engine (BDE) 118 and update encoder 116. Update generator 112 maintains, or receives from an external source, an original data image 120 corresponding to the subject client device 150 and is also supplied with or obtains a copy of the new data image 122 for the subject client device. The BDE 118 receives a copy of the original data image 120 and a copy of the new data image to be applied 122 and, through a process of comparisons, generates lists or sets of COPY and ADD operations which are potential candidate operations usable in generating the update package 124. Update encoder 116 communicates with BDE 118 to combine additional encoding information to select instructions from the BDE and incorporate other operations derived from additional information to ultimately create the update package 124. In the preferred embodiment, the update encoder 116 is highly integrated with the functionality of the BDE 118 so as to enhance optimization and speed of selecting and encoding instructions sets. Update generator 112, consistent with the invention herein disclosed, generates the update package 124, which at the appropriate time or interval is supplied to the client device 150 via the update manager 114 through communications network 140.

Figure 2:
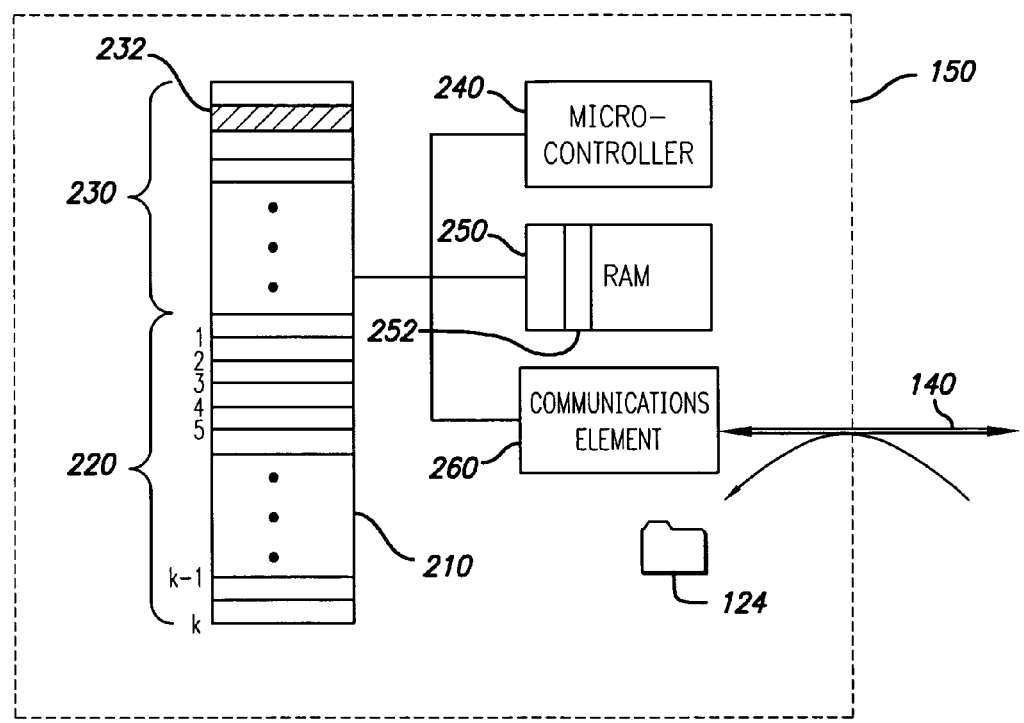
FIG. 2 is a block diagram illustrating components of a client device.

FIG. 2 depicts a typical client device 150, showing the relation of certain elements contained in or comprising the client device. In this embodiment, client device 150 includes a block-structured non-volatile memory device 210, a microcontroller 240, a random access memory (RAM) device 250, and a communications element 260. Client device 150 may likely also include, without limitation, other elements not shown, such as a display or visual user interface element, audio input/output elements and a keypad or other input devices or peripherals, the depiction of which with the client device is not essential to the understanding of the present invention by one skilled in the art.

Generally, to create the update package 124 and set of update instructions (later shown as element 302 in FIGS. 3A and 3B) comprised of ADD and COPY operations, a BDE 118 takes two binary images, here termed the original image 120 and the new image 122, and by comparing the two identifies a plurality of potential COPY operations which are sections of code in the original image 120 which can be used in creating the new image 122 by copying such source data to the new data location in the new image. An update encoder 116 uses the plurality of potential COPY operations created by the BDE 118 to selectively create a series or set of COPY operation interlaced with ADD operations, which ADD operations constitute that portion of the new image for which suitable source data was not identified by the BDE, or if identified then not selected by the encoder, for copying from the original image 120. Accordingly, update package 124 includes the update instructions, which includes the set of COPY operations selectively chosen as described above, ADD operations, as well as the code strings or data sequences to be added by the ADD operations. Thus, update package 124, in its most basic form contains a sequence of ADD and COPY operations that can be used to recreate the new image given the original image. In a conventional continuous non-block structured memory device the image to be created effectively starts empty, and the ADD/COPY operations sequentially create the new image by appending data to the new image either by copying new data held in the update package (i.e., ADD operations) or copying data from the source locations in the original image (i.e., COPY operations), and in such situations the original image 120 is assumed to be available throughout the update procedure as would be the case if the images were held as files on a conventional disk file system. However, as here, where the image to be updated is in a block structured non-volatile memory device 210 (and where potentially there is only enough additional memory available to hold an update package and not the entire new image) then the image must be updated with some additional variation from a typical continuous memory device. In the block-structure memory device 210, such as a flash memory device, the original image 120 is stored in a memory array that is divided into blocks 220 (and which are the eventual destination of new image 122), each of which must be erased in its entirely before it can be reprogrammed and thus cannot simply be incrementally updated as in an a conventional ADD/COPY update model.

Referring back now to FIG. 2, in the preferred embodiment, block-structured non-volatile memory 210 is what is known as flash memory which are available with large storage densities, for example 16 and 32 MB devices are commercially available. Flash memory is faster than EEPROM since it uses a parallel addressing and data format. Additionally, it has lower stand-by power consumption than EEPROM. Flash memory erases in blocks which are groups of bytes usually in multiples of 4 KB, 8 KB, 16 KB and so-forth. And though smaller blocks of, say, 8 KB are available, it is more common for flash memory devices currently in use to have block sizes on the order of 64 KB. Erasing a block at a time usually makes reprogramming flash memory faster than reprogramming EEPROM, which is the origin of the term "flash". Nevertheless, a block erase takes a relatively long time, typically anywhere from 0.5 to 1.0 seconds.

In any event, memory device 210, as stated, is a block-structured memory device for which original image 120 is programmed or saved across a first section of memory 220 comprised of a plurality of k blocks shown in FIG. 2 as blocks 1 through k. A remainder section 230 of memory blocks of memory device 210 store other relevant information such as data particular to the device or user. The relative size of first memory section 220 to that of remainder section 230 varies from implementation to implementation as determined by the needs of the device manufacturer. Moreover, the dividing line between the two sections is not strict in any necessary sense, as it only schematically represents the boundary between the k blocks storing original image 120 which is to be updated in any particular example and the remainder of memory device 210. In fact, in a single device, the representative dividing line may change as more (or less) memory blocks are recruited over the life of the device to store any particular program image to be updated, perhaps by the addition (or deletion) of operating system options or other application layers. Thus, in actuality, the remainder section 230 simply defines that portion of memory device 210 not comprising the k memory blocks used in storing original image 120.

One important element of remainder section 230 relevant to the invention is that there be at least a portion of the remainder section large enough to store the update package 124. Also, in regards to at least one embodiment of present invention for reliably restarting application of an update after power loss (as discussed later), an additional scratch block 232 of memory device 210 need be available that is at least as large as the largest memory block to be updated.

In addition to a scratch block 232 that may be useful in certain embodiments of the invention, a section of scratch memory 252 must be available in RAM device 250 during the processing and application of the update package, which scratch memory 252 must be (in addition to any other amount of RAM being used to process or run the update decoder application in general) at least the size of the largest flash block to be reprogrammed, since, as is described later, each of the k blocks to be updated is first built in RAM and then stored in its appropriate destination memory block location. It is possible that this scratch memory 252 could, alternately be a single block of flash memory dedicated for this purpose, since one of the benefits of flash memory is the high number of rewrites possible which makes this a real possibility; however, in the preferred embodiment scratch memory 252 is RAM memory. Note for purposes of this disclosure and description of the invention, scratch block 232 and scratch memory 252 are meaningfully distinct, as the former is in non-volatile memory device 210 and the latter is in RAM device 250.

Figure 3A:
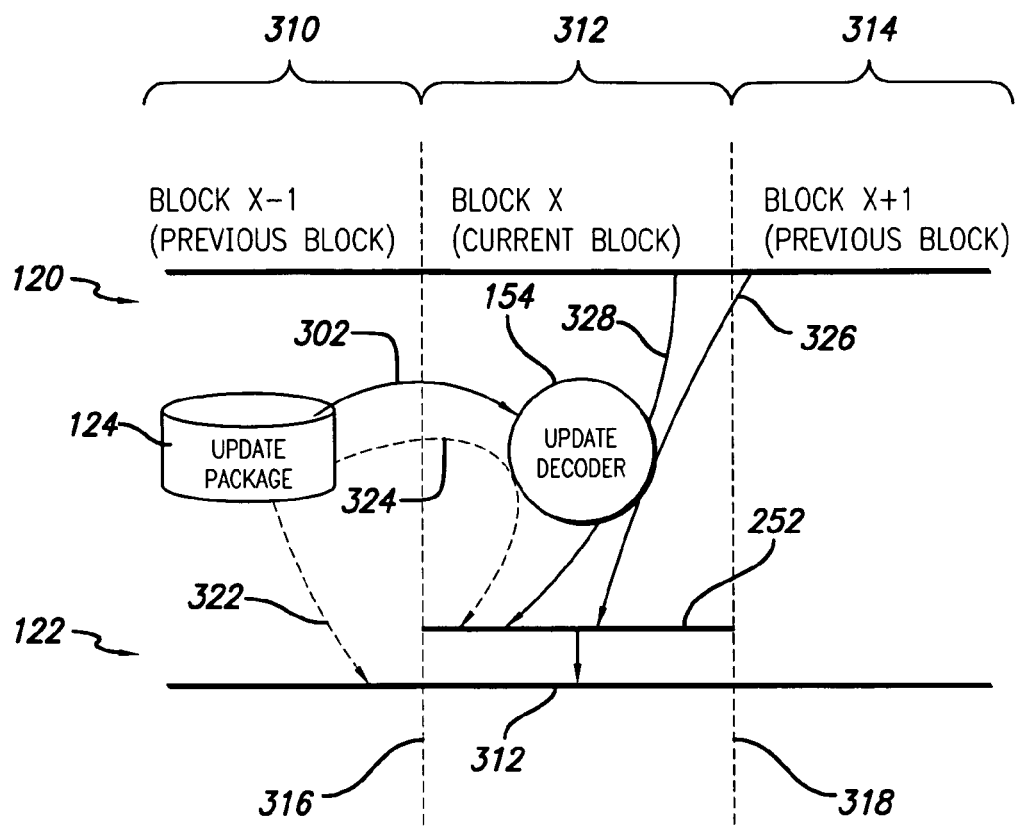
FIG. 3 is a schematic illustration of updating flash blocks in a flash memory device.

Turning now to FIG. 3A, a schematic representation of the update process in a block structured non-volatile memory, or flash device, is shown. Update package 124 has been received into the client device 150 and when the update process is invoked or commenced (see for example reference to FIGS. 4 and 9) the update decoder 154 interprets instruction set(s) 302 contained in the update package 124. The update instructions 302 are encoded to direct, among other things, how the update decoder 154 will append: (1) various elements of code supplied with the update package, shown as representative ADD elements 322 and 324, and (2) code copied from certain source data locations contained in the original image, shown as representative COPY elements 326 and 328.

Specifically, referring to FIG. 3, flash memory device is divided into a plurality of memory blocks 310, 312 and 314, which represent the current block being updated at any one time (block 312) and the blocks updated immediately previously to the current block (310) and immediately after the current block (314). A notable feature of the block structure of flash memory devices is that for each block 312 there are respective block boundaries 316 and 318. The existence of these block boundaries requires that COPY and ADD operations that would otherwise straddle a block boundary must split, either in their source elements, such as in COPY operations 326 and 328 and in there respective destination, such as representative ADD operations 322 and 324. The existence of block boundaries necessarily increases the number of operations in an update instruction set, as they cause a bifurcation of instructions that would not occur in a conventional continuous update application. For this reason, and as will become more evident below, the increased number of operations as a result of bifurcation at block boundary only emphasizes the importance of and return on any efficacies that can be achieved by reducing the general operation overhead of each instruction.

In its most simple form, an appropriate update package 124 can be generated by starting at the beginning of the image and working up the address range as for the usual non-flash-memory case. However, three basic changes are required to allow the update package 124 to be applied to block-structured non-volatile memory device, such as a flash memory. First, as mentioned, an ADD or COPY operation where the destination region spans the next block boundary in the new image 122 must be split into two operations at that boundary point (e.g., at 316). Second, when searching for candidate COPY operations, the BDE must use the new image 122 as the source of copy operations that start before the current block that is being processed (e.g., 310b of FIG. 3B). This is because when updating block X 312, block X−1 310 has already been reprogrammed and contains the new image 122 for that block and not the original image 120. Typically a BDE will build a hashtable for the original image to quickly find potential source regions for copy operations; in this procedure, similar hashtables for both images would be generated and rather than searching only the original table for candidate locations, both are searched, and the appropriate image inspected to find an actual match depending on whether, as above, the location found lies before or after the start address of the current flash block. And, third, for simplicity, COPY operations whose source lies before the start of the block currently being processed should not cross into that block. Although the COPY can cross this boundary with no impact on the decoder, the BDE would need to switch source images at this boundary. A further reason that makes this restriction desirable is noted later (see discussion below).

Figure 3B:
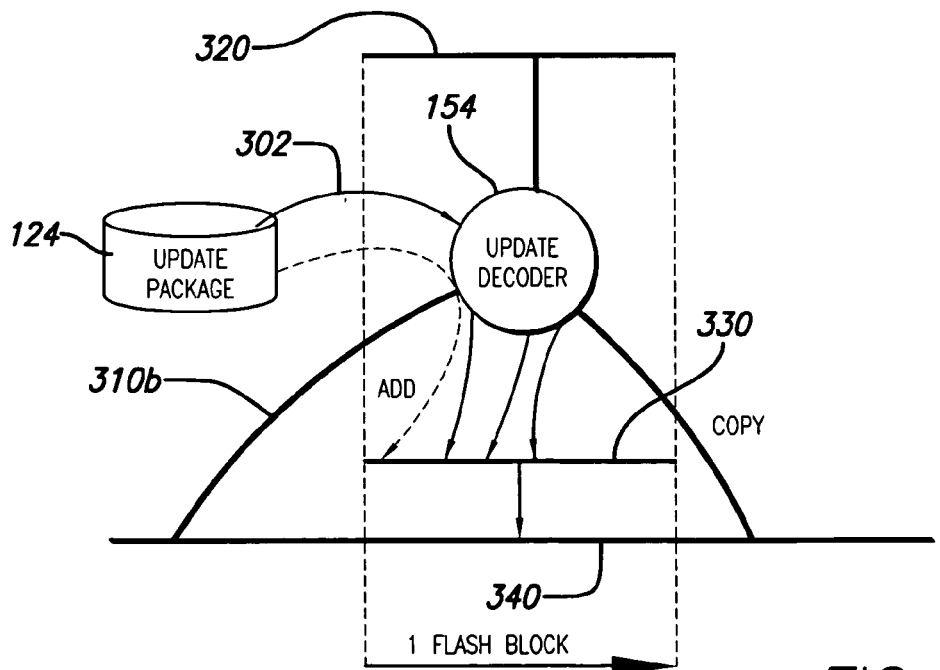

Thus, as shown in FIG. 3B, to apply the update, the decoder starts from the beginning of the current image, and builds-up a replacement for the Xth block of the image in scratch memory area 252, shown schematically as 330. As stated, a section of scratch memory need be available that is at least the size of the largest flash block to be reprogrammed. When the block is completely built (which must correspond to the end of an operation) the actual destination memory block X for such block image (indicated at 340) is erased and reprogrammed with the content of the new version of that block present in the scratch memory area. The decoder then moves to the next block and repeats the procedure until the end of the k memory blocks to be updated constituting the image is reached.

Figure 4:
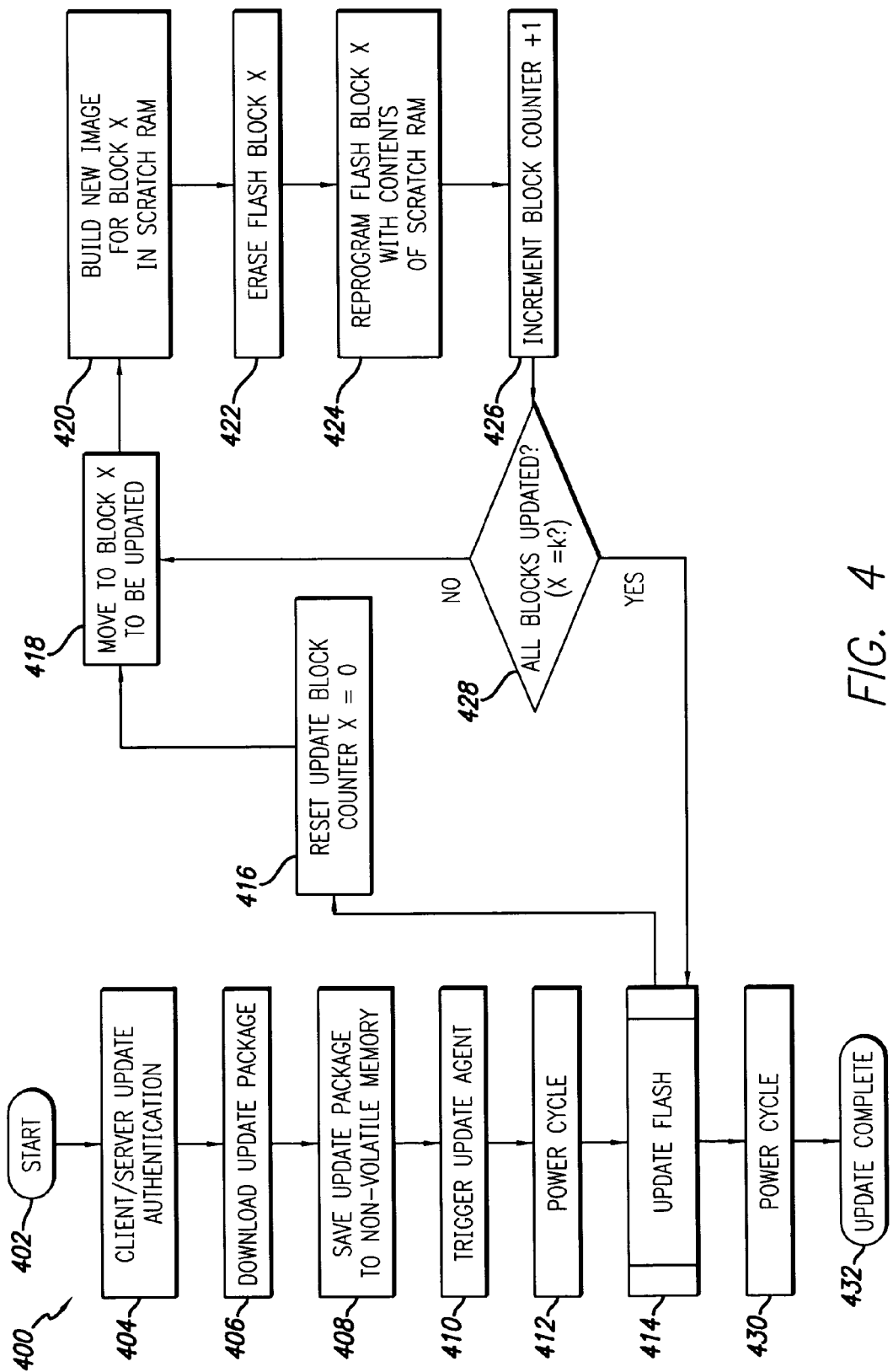
FIG. 4 is a flowchart illustrating one embodiment of updating a flash memory on a block-by-block method.

FIG. 4 illustrates an installation process 400 for applying an update package 124 generated in accordance with one embodiment of the invention, which process may be used in conjunction with the communications network 140 as a means for communicating the update package to a client device as described in FIG. 1. The process for applying the update package 124 commences at a start state 402 where it is desirable for a client device having a first original image 120 programmed across k blocks of a block structured non-volatile memory device 210 to have such original image reprogrammed with a new image 122. In such case, the client device first communicates with an update manager aspect 114 of host update server 110 and may proceed through an authentication step 404 whereby the client device and update server 110 confirm any variety of parameters to ensure a correct update selection. This may include, for example, authenticating the identity of the particular client device 150, confirming the code version of the original image 120 to be updated so as to create or use the correct update package based on the original image and new image, verifying the active status of a user of the client device registered to receive new image updates or any other form of security or verification protocols necessary. The commencement from the start state to the first step 404 may be initiated by either the client device 150, perhaps programmed to probe for the availability of updates on a particular schedule, or by the update manager 114 which may query any number of client devices for particular information that triggers the need for an update.

After confirming the need for an update and the verification step 404, the update package 124 is downloaded to the client device. On the client device 150 is a download agent 152 which manages the receipt of the update package at step 406 which update package is next saved at 408 in a portion of non-volatile memory which is not to be reprogrammed by application of the current update, such as in a remainder section 230 of non-volatile memory device 210 which is distinct from the k blocks 220 which will be updated. The download agent may also conduct additional verification steps with the update server to confirm receipt of the correct and complete update package.

Once the update package 124 is received, saved and confirmed complete, the update agent 156, which is comprised of the update decoder 154, is initiated at 410. According to one embodiment, the client device next at 412 steps through a power cycle to deliver control of the microprocessor and client device during the update application process from the resident device OS to the update decoder. At its subsequent point 414 the cycle begins of applying the substantive content of update package 124 by, at step 416, setting or resetting an update block counter to zero (or some other predetermined value that can be meaningful used in conjunction with the counting mechanism used when encoding the update package and update instruction set).

At state 418 begins with the first block X of the k blocks to be updated according to instruction set 302 and at state 420 builds the Xth block of new image 122 in scratch memory 252. Building the content of the Xth block to be reprogrammed is comprised of ADD and COPY operations as directed by the instruction set 302, though it is possible that any Xth block may constitute only a single ADD operation or single COPY operation. Once the new image content for Xth block is complete in scratch memory, then the destination memory block X 312 (also shown as 330 in FIG. 3B) of non-volatile memory device 210 erased at state 422 and subsequently reprogrammed with the then current content of scratch memory 252 at state 424.

At step 426, after each Xth block has been reprogrammed with its new image content, then an update block counter is incremented and the process proceeds to determine at state 428 whether, according to the update block counter, whether all blocks have been updated. If it is determined that still less than the complete k blocks have been updated, then the update application process returns to step 418, whereupon the update decoder moves to the next Xth block+1. This process of updating continues until at query state 428 it is determined that the new image to be updated across the block-structured non-volatile memory has been applied to all k blocks to be updated, at which point the update process returns to state 414 and proceeds to go through a power cycle at 430 to return control of the client device to the client device OS which may include, at least in part, the new image 122 update applied to the client device.

Figure 5:
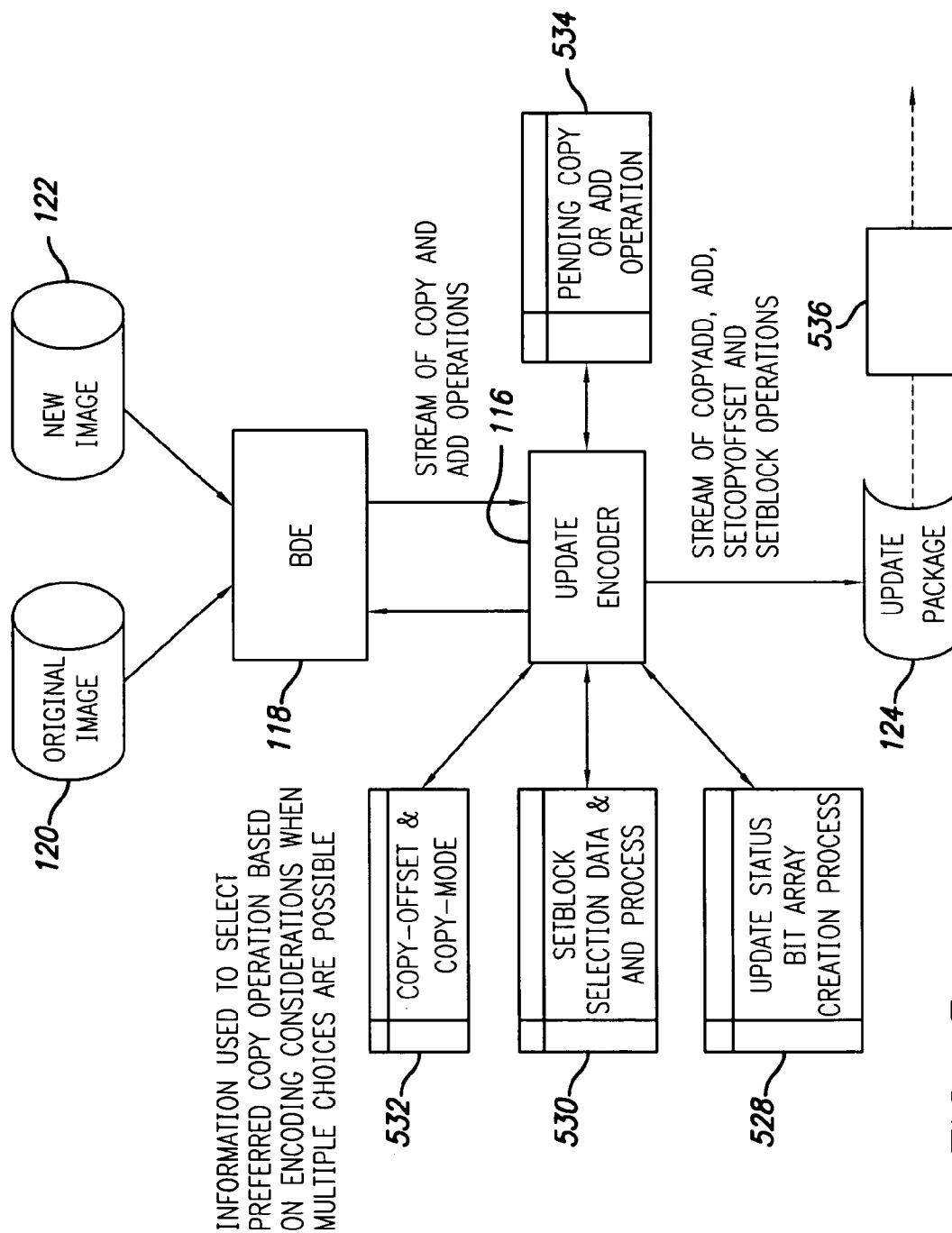
FIG. 5 is a block diagram illustrating components involved in generating an update package.

FIG. 5 is a block diagram showing the relationship of some elements involved in generating an update package 124 according to at least one embodiment of the invention. When binary images containing microprocessor instructions and data are modified to add new functionality or fix errors in the original image 120, the changes between the images tends to exhibit common patterns irrespective of the actual type of microprocessor to which the image relates. The ability to express these common patterns of changes is key to minimizing the size of an update package 124 that can be used to convert the original image 120 into the updated new image 122.

Figure 6:
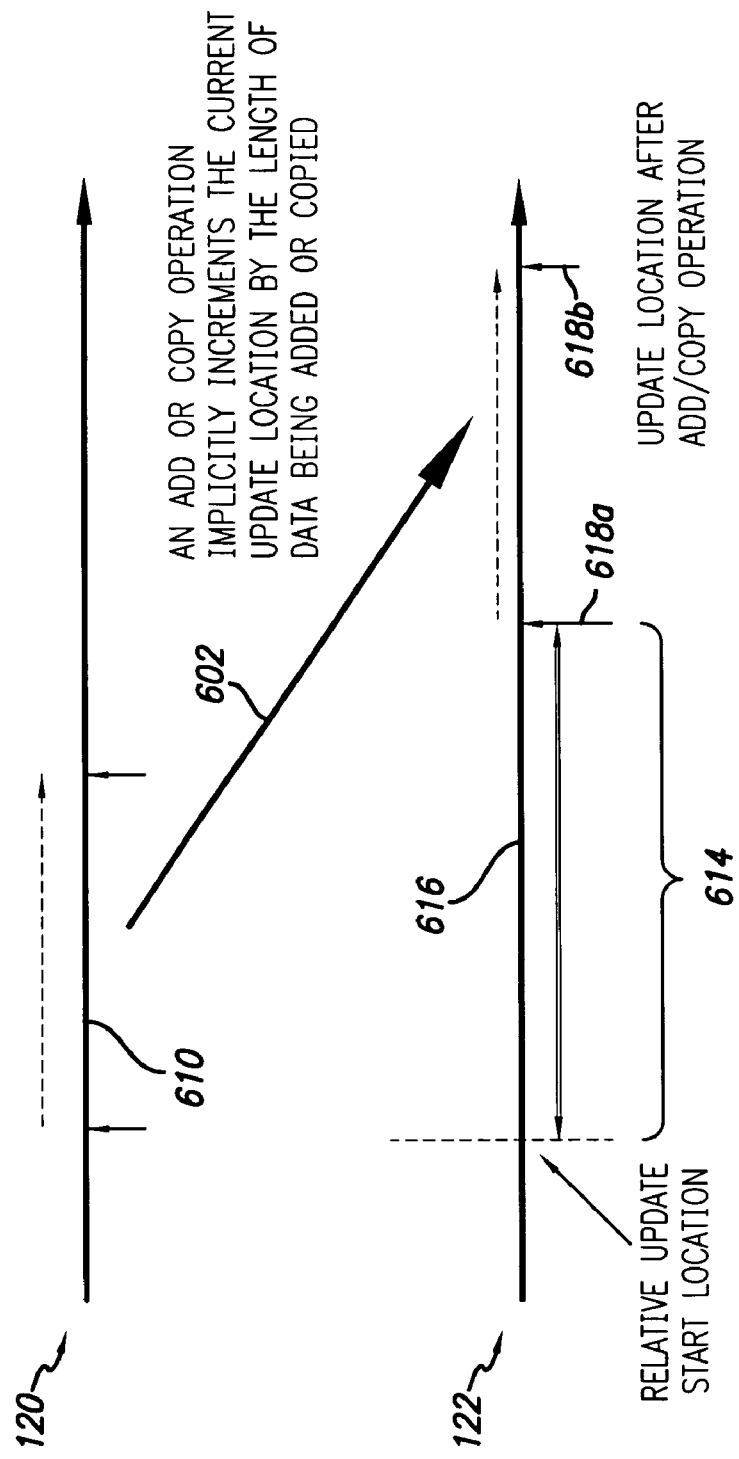
FIG. 6 illustrates the copy-offset increment incurred when updating.

In FIG. 5 is shown a very high-level conceptualization of the interrelation of several functional and informational elements in the update generation process. BDE 118 has access to an original image 120 and new image 122 as inputs. The BDE communicates (or is highly integrated with) update encoder 116 which receives lists or sets of potential COPY and ADD operations identified by the BDE. The update encoder may also provide feedback to the BDE in narrowing or directing the search of comparable segments of the original and new images. During encoding, encoder 116 typically buffers some number of potential operations fed from the BDE in a set of pending COPY and ADD operations 534. The encoder 116 then selects and arranges updating operations, fed from the BDE directly and from the pending operation buffer, into an instruction set 302 that is comprised of various operations, including COPY and ADD operations. The instruction set 302 also includes, in accordance with the present invention, SETCOPYOFFSET, COPYADD and SETBLOCK operations which are further described below. As is shown in FIG. 5, information relating to copy-offset 532 is generated and used to select preferred operations. The details of copy-offset 532 are described in relation to FIGS. 6 and 7 below. The update encoder also generates and uses information from a SETBLOCK selection and encoding process 530, whereby feedback and information are used to iterate and determine more efficient order of block updating. The details of the concept of SETBLOCK operations is detailed in relation to FIG. 8 and an examples which follow and relate to FIG. 8.

Finally, in addition to the instruction set of various operations (be they COPY, ADD, SETBLOCK, SETCOPYOFFSET, etc.), the resultant update package 124 is further comprised of additional information. In the preferred embodiment, the update encoder 116 also generates information from a status bit array creation process 528 to include and encode in the update package 124 a status bit array 930 that is used in tracking the status of the update process which can then be used to reliably restart the update process in the event of a power loss or other interruption of the update process.

The encoded update instructions can finally be compressed prior to storage in the update package 124 using a suitable binary compression algorithm (e.g. zlib). An improvement to simple compression here is achieved by storing the new data to be added by the ADD (or COPY-ADD) instructions separately from the ADD, COPYADD and SETCOPYOFFSET instruction stream. Each of these two areas is independently compressed. This generally gives better overall compression than storing the new data together with the associated ADD instruction. The instruction stream tends to compress relatively poorly, however the new image data can contain highly compressible data which benefits from not being intermixed with the instruction stream itself.

Use of Setcopyoffset Operations

In the case of updating a first original image 120 to that of a new image 122 with additional or revised code, whether comprised of bug fixes and/or additions of new functionality, it is frequently the case that a large number of COPY and ADD operations are generated where typically the ADD operations are adding only 1 or 2 bytes, interspersed by COPY operations where anything from a few tens of bytes to thousands of bytes are being copied from the source image 610 which is of a preexisting sequence in the original image 120. Additionally, over large ranges it is often the case that a large portion of the COPY operations will be found to be copying data from source locations at a constant offset 614 to the current update location 618 in new image 122.

Efficiently expressing these common case ADD and COPY operations is critical to reducing the size of the resultant update package 124.

The overall size of a typical ADD operation is predominately determined by the size of the data inserted or the "add" data, whether it be 1 or 2 bytes or 100 bytes, because the ADD operation is a combination of the ADD instruction and the "add" data itself, which is of a fixed and often irreducible size. This is unlike a COPY operation, which can express large portions of "copy" data to be used in a new image in only a few bytes (regardless of the size of the amount to be copied) because the COPY operation is simply an instruction to a copy source destination (ie. start address) with a copy length. Accordingly, inserting just a 10 byte string by an ADD operation requires the ADD instruction (say 2 bits to identify the operation) plus the 10 byte length of code, whereas inserting a 10 byte string by a COPY operation can be as little as only 1 or two bytes (simply to identify the operation, the location of the copy source, and the copy length). Because of the nature of these operations, the efficiency gains of encoding COPY operations can be more significant than that of ADD operations, ie. reducing the size of a COPY instruction by a single byte gives a much greater percentage decrease in the overall operation size than for an ADD operation dealing with the same number of bytes of the image.

Thus, in a system seeking to minimize the size of an update package 124 comprised of an instruction set, at a first order of sophistication a BDE 118 and update encoder 116 search to maximize the amount of the new image 122 to be created from COPY operations and hence minimize ADD operations, and in particular to minimize ADDs of large strings of code. However, the number and length of ADD operations is balanced against generating an unacceptably high number and multitude of COPY operations (and hence total operations altogether) which, despite their relative small size, can accumulate to be unacceptably large in great numbers and undermine the goal of a small instruction set and overall update package size.

Bearing the foregoing in mind, the encoding of an update package 124 can be made more efficient and the selection of particular COPY versus ADD operations generated by a BDE can be favorably affected by adopting an encoding system for ADD and COPY instructions that take advantage of the known and frequent use of offset copying, which shall be discussed presently.

Each successive ADD and COPY operation in an instruction set defines a current location in the new image that is being updated. This current location is the destination of the then current ADD or COPY operation being executed. When completed each operation therefore implicitly increments this location by the amount of data added or copied by that operation, thereby setting the current location for the next operation, e.g., the current location is incremented by the length of copy data 602, from 618a to 618b (unless a specific address relocation is called for by the next operation.

Accordingly, COPY operations can be expressed as a length of data to be copied plus an offset into the current update location used to express the source location for the copy. The source location is thus calculated as an index into the new image 122 and is used as an index into the original image 120. Thus, a COPY operation is logically expressed as a length, and an offset: COPY(length, copy-offset). The source location of the data to be copied in the original image is calculated by adding the copy-offset value (which may be positive or negative) to the value of the current update location to give an absolute location in the new image; the numeric value of this location is then used as a location in the original image. Because the copy-offset is frequently the same for many COPY operations it is not specified with each COPY operation, but is maintained by the update decoder 154 in a scratch memory location 256 as a copyoffset data field. Thus, the only parameter actually specified with a COPY operation now is its length, i.e. physically a COPY is expressed simply as: COPY(length). This has the effect of, on a percentage basis, greatly reducing the size of the majority of COPY operations.

Because a COPY operation does not specify its own copyoffset value, a new operation is needed to set the required value of the current copy-offset value held within the update decoder 154, i.e., a SETCOPYOFFSET operation. Since many sequences of COPY operation can have the same offset value, SETCOPYOFFSET operation is not required with each COPY operation. Rather, the value of the copy-offset remains unchanged in the copyoffset data field 256 until the next SETCOPYOFFSET operation is encountered and will be used until the copyoffset data field is changed by another SETCOPYOFFSET operation. The SETCOPYOFFSET operation does not itself cause the new image to be updated in any way; it only sets the value used in the calculation of the source data location for all COPY operations occurring between two SETCOPYOFFSET operations.

Figure 7:
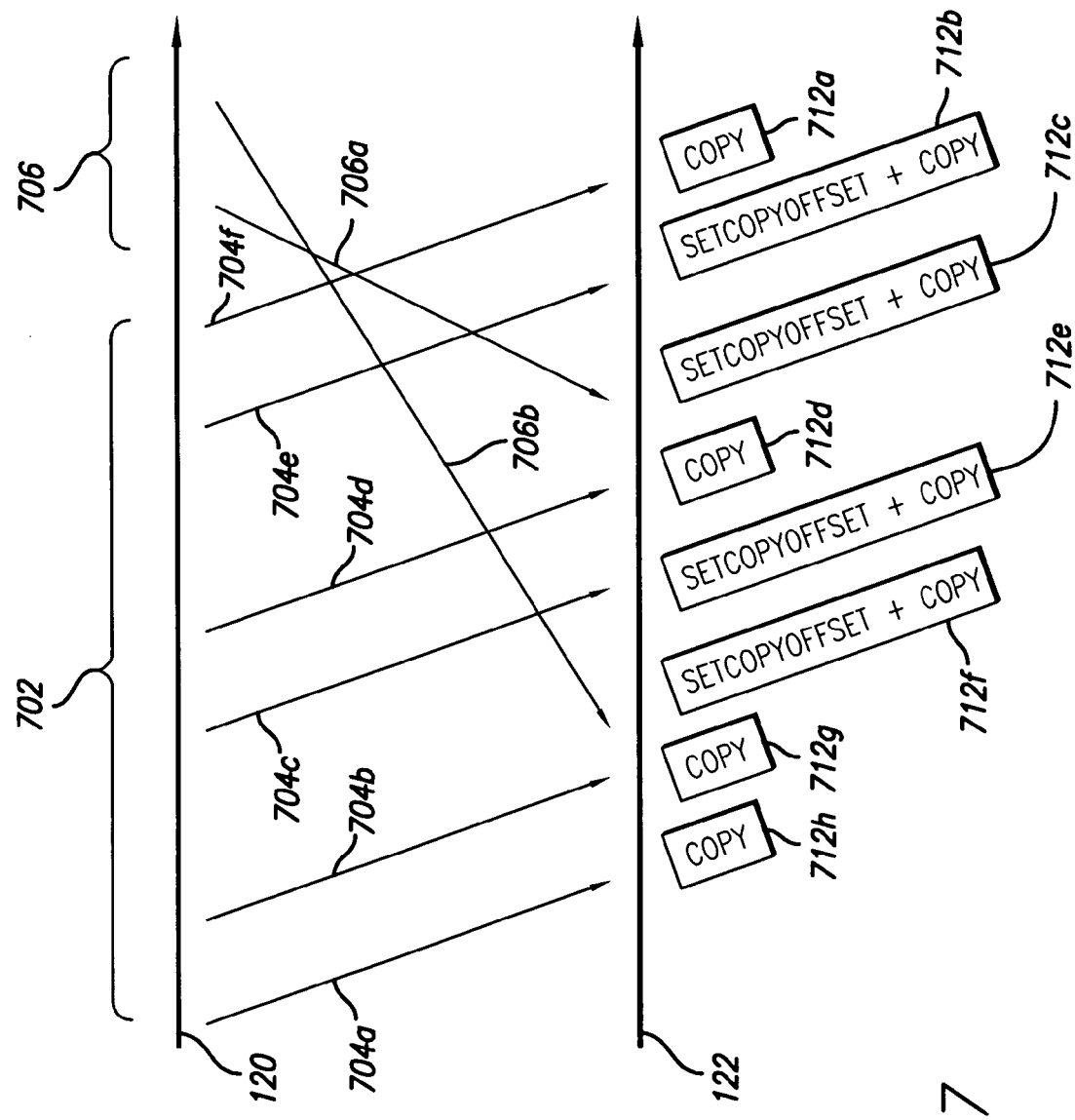
FIG. 7 illustrates the use of the SETCOPYOFFSET operation in implementing an update as a series of COPY and SETCOPYOFFSET operations.

Referring specifically now to FIG. 7, a generic example of the shows the schematic use of SETCOPYOFFSET operations. It is more efficient for the update decoder 154 to hold 2 copy-offset values and to mark one of them as 'current'. A SETCOPYOFFSET operation swaps the current and non-current values, and then updates the new current value to that of the copy-offset specified by the operation's parameter. A COPY operation simply takes whichever copy-offset value is marked as current. This allows the case where a large block of code has been relocated to be efficiently expressed even where some byte sequences within the relocated block have been modified in such a way as to mean that they are better copied from somewhere unrelated in the original image. This is a commonly observed case in real modifications to microprocessor instruction sequences. This is better than using a single copy-offset value because the SETCOPYOFFSET operations 712b and 712ed only need to swap the 'current' copy-offset marker—this in general will require a smaller operation encoding than using a SETCOPYOFFSET operation to reload the previous copy-offset value. It is important to note that the SETCOPYOFFSET operation does not specify which copy-offset value is to be modified—it just toggles between the two possible values.

Use of Copyadd Operation

Furthermore, when using this copyoffset technique, it is preferable to use a combined COPY/ADD operation, one which encodes a COPY operation followed by an ADD operation in a single operation, rather than having a simple COPY operation. When necessary, a simple COPY operation can be expressed as a COPYADD with a zero length ADD if required.

All the COPYADD, ADD, and SETCOPYOFFSET instructions preferably have several encodings available, the most critical of these being the single byte forms of the COPYADD and ADD operations. For example a COPYADD operation using 1 bit to identify it as COPYADD, 5 bits for the length of the COPY operation, and 2 for the length of the ADD can encode a large number of basic image modifications is a simple stream of single byte instructions (excluding the new data required for the ADD operations). A small ADD instruction is also required, for example, using 2 bits to identify the operation and 6 for the length. Wider forms of both COPYADD and ADD are clearly also required and in practice several such 'widths' must be provided, however the encoding of the smallest forms of the instructions are always the most critical for space efficiency. All widths of the COPYADD instruction need only allow 2 bits for the ADD operation length; longer ADDs being expressed by a following ADD instruction where required (see TABLE 1 below)

TABLE 1

| ADD | 1 byte form | 2 bits to identify operation (e.g. bits 7 ... 6 == 10) 6 bits to encode ADD-length |
| --- | --- | --- |
| | 2 byte form | 8 bits to identify operation (e.g. bits 7 ... 0 of $1^{st}$ byte == 11111000) 8 bits to encode ADD-length |
| | 3 byte form | 8 bits to identify operation (e.g. bits 7 ... 0 of $1^{st}$ byte == 11111001) 16 bits to encode ADD-length |
| COPYADD | 1 byte form | 1 bit to identify operation (e.g. bit 7 == 0) 5 bits to encode COPY-length 2 bits to encode ADD length |
| | 2 byte form | 4 bits to identify operation (e.g. bits 7 ... 4 of $1^{st}$ byte == 1110) 10 bits to encode COPY-length 2 bits to encode ADD-length |
| | 3 byte form | 5 bits to identity operation (e.g. bits 7 ... 3 of $1^{st}$ byte == 11110) 17 bits to encode COPY-length 2 bits to encode ADD-length |

A further efficiency gain in the expression of COPY operations is achieved using a 'mode' indicator maintained by updated decoder 154, where the operation either uses the copy-offset values as above, or switches mode to use a zero offset. This 'mode' indicator, as for the copyoffset value, is kept in the client device's RAM memory area 250. This is frequently useful even in images which have been changed extensively, since commonly much of the image will not have moved, even though such regions may contain numerous minor changes. Additional forms of the SETCOPYOFFSET operation are used to switch into and out of this 'switch-mode'.

As for the COPYADD and ADD operations, various 'widths' of the SETCOPYOFFSET operation must be available. In this case it is beneficial to allow different forms of the operation that either set the copy-offset to a given absolute (signed) value, or modify the copy-offset value by addition of a (signed) delta. Single byte forms of the SETCOPYOFFSET instruction must exist to swap between the copy-offset values and switch into and out of zero-offset mode.

TABLE 2

| SETCOPYOFFSET | 1 byte forms | 5 bits to identify operation (e.g. bits 7 ... 3 == 11000) 3 bits to encode relative offset |
| --- | --- | --- |
| | | 8 bits to identify operation (e.g. bits 7 ... 0 == 11011111) Switches into & out of switch-mode |
| | 2 byte forms | 5 bits to identify operation (e.g. bits 7 ... 3 of $1^{st}$ byte == 11001) 11 bits to encode relative offset |
| | | 5 bits to identify operation (e.g. bits 7 ... 3 of $1^{st}$ byte == 11010) |

TABLE 2-continued

| | | 11 bits to encode absolute offset |
| --- | --- | --- |
| | 3 byte form | 6 bits to identify operation (e.g. bits 7 ... 2 of $1^{st}$ byte == 110110) 18 bits to encode absolute offset |
| | 4 byte & larger forms | etc ... |

Three different forms of the SETCOPYOFFSET operation are given above; there are many different possible variations on the above examples, however these operations support the required minimal functionality:

1. The absolute form swaps the current and non-current copy-offset values, and then simply sets the new current value to that of the copy-offset specified by the operation's parameter. An implicit switch out of zero-offset mode is also performed.
2. The relative form swaps the current and non-current copy-offset values, and then adds the signed value specified by the operation's parameter to the new current value. An implicit switch out of switch-mode is also performed.
3. The switch-mode form simply switches into and out of zero-offset, without changing either which copy-offset value is considered current, or the value of either stored offset.

The widest absolute offset that can be specified in the encoding (18 bits in the above example) tends to impose a limit on the largest input images that can be encoded. Wider encodings of the SETCOPYOFFSET operation (4, 5 bytes etc) allow for handling of larger images. In practice however most SETCOPYOFFSET operations can be encoded using a fairly small relative offset (11 bits in the above example). The ability to specify such 'close' offsets efficiently in the encoding is critical to reducing overall update package sizes as these are generally much the most common.

The stream of high-level COPY/ADD operations generated by the BDE is trivially encoded into the required low-level COPYADD, ADD, and SETCOPYOFFSET instructions. The encoder must maintain the two copy-offset values and the zero-mode setting as the encoding progresses, and select the smallest form of each instruction encoding that will express the desired high-level operation. A simple one instruction submit/commit scheme is required to allow high-level COPY/ADD operations to be merged into the low-level COPYADD or COPYADD/ADD instruction sequences.

The overall space efficiency of the encoding is improved if the relative cost of various candidate COPY operations is known to the high-level BDE. This enables an informed choice of operations to be made where multiple possibilities exist at a given point in the image. For example, it may be better to select a COPY which can use the current copy-offset even though it copies fewer bytes than another COPY which must first modify the copy-offset value; this is particularly true where the second COPY requires a large change to the copy-offset value and thus may require significantly more bytes to encode than the first COPY.

Although the above encoding scheme relates mainly to changes in microprocessor instruction streams, it will in general also encode the differences in arbitrary data with a good degree of efficiency. This is useful in that it allows an update package to be prepared and encoded as above for an entire binary image even though some of the data in that image is not in fact microprocessor instructions. This means that the encoding can be applied without any knowledge of the microprocessor concerned or the internal structure of the image with respect to code and data areas. In turn this means that both the encoder and decoder for the update package can be relatively simple and thus in the case of the decoder, can be implemented for devices with relatively slow processors and limited memory availability (e.g. a mobile phone).

Use of Setblock Operation

In many cases, particularly where new functionality is being added to an image, there is a tendency for large parts of the original image to be moved up the address range of the image as code and/or data is inserted into the image in various places. Depending on the size of this movement the above simple procedure tends to become increasingly inefficient because as each block is updated it destroys some of the source data needed to efficiently express the next block in the new image. For this reason it is often (though not always) beneficial to generate such update packages from the end of the address range downwards as follows.

Within each block the basic procedure remains unaltered; however the BDE starts from the beginning of the last block in the image and works to the end of that block, then steps back to the start of the preceding block and repeats the process until the start of the image is reached. This can be expressed easily by adding a SETBLOCK operation to the basic ADD/COPY pair. The SETBLOCK operation identifies the next block to be updated to the decoder; although not technically required if the direction of processing is known and all blocks are updated, it allows for further optimizations as noted later, for example the ability to remove unchanged blocks from the update package entirely, and also remove trailing COPY operations from a block as demonstrated with specific examples of sample instruction sets relating to FIG. 8.

The basic changes to the update package encoding using SETBLOCK operations become:
1. An ADD or COPY operation whose destination region crosses the end of the current block being updated is truncated at the end of the block (the image after that point has already been updated).
2. When searching for candidate COPY operations, the BDE must use the new image as the source of the copy for operations that start after the end of the current block that is being processed (again, if applicable, this is trivially dealt with using the two hashtables as described earlier).
3. For simplicity, COPY operations whose source lies within the block currently being processed should not cross out of that block. Although the COPY can cross this boundary with no impact on the decoder, the BDE would need to switch source images at this boundary. A further reason that makes this restriction desirable is noted later.

Except for the requirement to process the SETBLOCK instruction rather than simply move to the next block in sequence, the decoder described for the basic procedure above works unchanged. In fact the SETBLOCK instruction becomes a trivial delimiter for the end of updates related to the current block.

If the BDE can generate update packages using both procedures given above, a simple extension is, for any pair of input images, to generate both update packages and simply discard the larger. Much of the cost in generation time is usually creation of the hashtables—however these are the same in both cases, so caching the tables allows both packages to be generated, and one discarded, in substantially less than double the time taken to generate a single package. If the SETBLOCK instruction is made an intrinsic part of the encoding then the same decoder can be used for either package style without regard to the order in which blocks are updated.

Note that a side effect of the generation mechanism within the BDE is that each flash-block is updated at most once. This is important when considering times required to apply update packages since the time to erase and reprogram a flash-block is typically of the order of 1 second; this erase/reprogram time, once all updated blocks are accounted for, will dominate the time taken to apply a package even when using a slow processor.

One further advantage of use of the SETBLOCK instruction in all encodings is that if any block of the image is updated by a single COPY operation from the same location in the original image then both the COPY and associated SETBLOCK instructions can be removed from the BDE output entirely. This ensures that flash-blocks that are not modified at all will not be pointlessly erased and reprogrammed by the update package. For localized changes this optimisation has a dramatic effect on the time required to apply the update package for the reasons noted above regarding erase/reprogram times of flash blocks.

Figure 8:
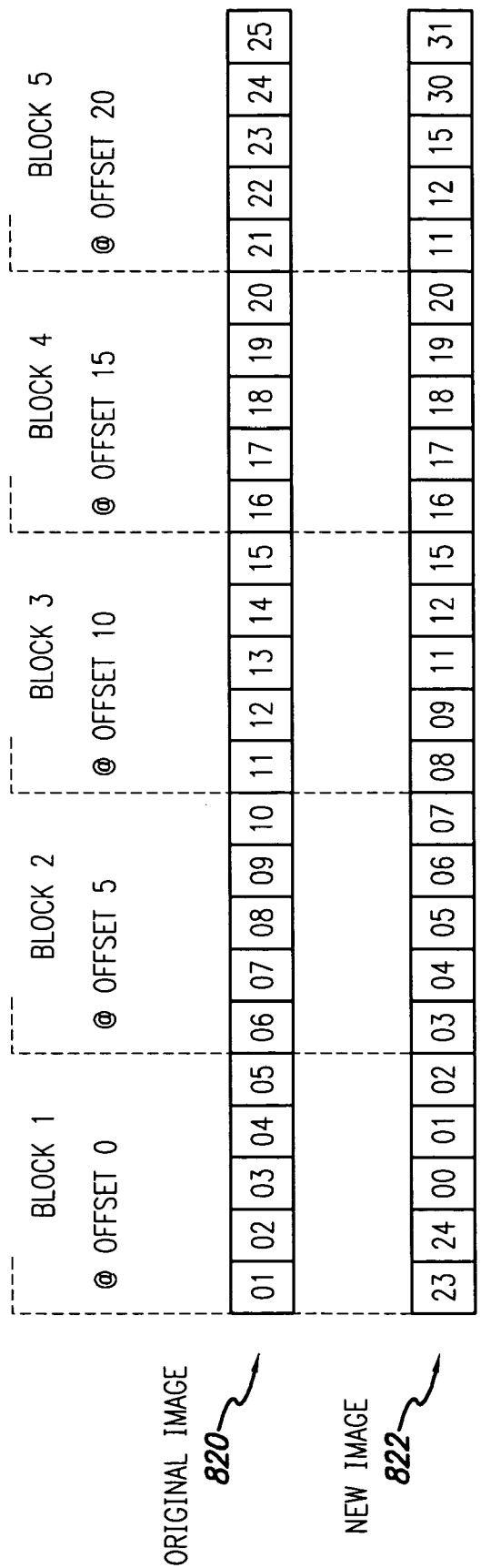
FIG. 8 is an illustration of a sample original image and sample new image used in demonstrating the effect of the present invention in generating efficient update packages.

The use of the SETBLOCK operations in encoding an instruction set will now be address by way of an example set forth in FIG. 8. The following examples demonstrate how the COPY/ADD/SETBLOCK operations described can be used to apply in-situ updates to a hypothetical flash memory device. All examples translate between the two 25 byte images shown in FIG. 8. The flash device will be considered to comprise 5 blocks of 5 bytes each.

It should be noted that this trivial example data is designed to show some of the issues discussed; it is not representative of any real data—which might typically comprise images of between 1 and 16 MB (or indeed more) in size. The original and new images in the pair may also differ in size. A typical real flash device might be uniformly divided into 64 KB blocks (though many different possibilities exist).

With reference to FIG. 8, use of the conventional image update procedure (e.g., non-update-in-place, non-block-structured) to convert sample original image 820 to sample new image 822 might produce the following as in Sample Instruction Set No. 1.

| Sample instruction set No. 1 |
|---|
| COPY 2 @ 22 |
| ADD 1 {00} |
| COPY 9 @ 0 |
| COPY 2 @ 10 |
| COPY 6 @ 14 |
| COPY 2 @ 10 |
| COPY 1 @ 14 |
| ADD 2 {30, 31} |

Whether this is the smallest update package possible depends on the binary encoding used to express the operations (e.g. in practice it might well be more efficient to express "COPY 1 @ . . . " as an ADD); however for the purposes of this discussion logical correctness is required so for these examples the update operations in the packages will be shown as follows:

COPY n @ m—where n is the number of bytes to copy, and m is the source offset.

ADD n {x, y . . . }—where n is the number of bytes to add, and x, y . . . are the actual values.

SETBLOCK n—where n identifies the new block at which to start the next operation.

Some of the more obvious issues with using the instructions of Sample Instruction Set No. 1 in a block-structured update-in-place manner are noted as follows. For instance, the third operation (ie. COPY 9 @ 0) requires buffering in the update decoder, which buffer may in principle need to be as large as the images to deal with an arbitrary update. Consider a COPY that moves a large amount of data (e.g., 2 KB up the address range by 100 bytes; if the copy were allowed to cross a block boundary then the source for the first 100 bytes fo the copy required just after the block boundary is destroyed unless the update decoder internally buffers this source data. In pathological cases, the copy might cross dozens of block boundaries, which then required significant amounts of buffer space. To also allow for recovery after power loss, the buffer needs to be non-volatile. Beside any memory capacity issues, this also adds significant complexity to decoder. Additionally, the sixth operation (ie. COPY 2 @ 10) is a call for a COPY operation from source data that has already been overwritten by this stage. Accordingly, certain alterations are necessary to apply an update to a block-structured memory versus a conventional continuous memory update.

The following Sample Instruction Set No. 2 illustrates the first step in making it feasible to apply the update in an update-in-place, block-structured, manner.

| Sample instruction set No. 2 | |
| --- | --- |
| Block 1 | COPY 2 @ 22 |
|  | ADD  1 {00} |
|  | COPY 2 @ 0 |
| Block 2 | ADD  3 {03, 04, 05} |
|  | COPY 2 @ 5 |
| Block 3 | ADD  2 {08, 09} |
|  | COPY 2 @ 10 |
|  | COPY 1 @ 14 |
| Block 4 | COPY 5 @ 15 |
| Block 5 | COPY 3 @ 12 |
|  | ADD  2 {30, 31} |

As Sample Instruction Set No. 2 makes evident the decoder now only deals with a single destination block at a time, and COPY operations where the source data would previously have been overwritten by an earlier part of the update have been replaced by ADD operations. Note that in one instance it is possible to copy data from another part of the image which has itself already been updated. For example, it can be seen that for the third operation (i.e., COPY 2 @ 0) all original content of 'current' block is available for copying while new content is created. Also, the first operation relating to block five (i.e., COPY 3 @ 12) instructs the copying of data from part of image that has already been updated. The basic update here is still sequential from the start of the image to the end (sequential bottom-up); there are no further improvements that can be made to this update package without extending the number of operations that can be expressed within it, i.e., specifically the addition of a SETBLOCK operation as described in the next figure.

Sample Instruction Set No. 3 adds the SETBLOCK operations to explicitly identify which operations relate to which blocks—however all the other operations are exactly as before.

| Sample instruction set No. 3 | |
| --- | --- |
| Block 1 | SETBLOCK 1 |
|  | COPY 2 @ 22 |
|  | ADD  1 {00} |
|  | COPY 2 @ 0 |
| Block 2 | SETBLOCK 2 |
|  | ADD  3 {03, 04, 05} |
|  | COPY 2 @ 5 |
| Block 3 | SETBLOCK 3 |
|  | ADD  2 {08, 09} |
|  | COPY 2 @ 10 |
|  | COPY 1 @ 14 |
| Block 4 | SETBLOCK 4 |
|  | COPY 5 @ 15 |
| Block 5 | SETBLOCK 5 |
|  | COPY 3 @ 12 |
|  | ADD  2 {30, 31} |

Having added the SETBLOCK operations, it is now clear that block 4 is unchanged by the update and therefore the SETBLOCK and COPY operations that relate to it can simply be removed, thus eliminating the need to reprogram block 4 at all in the instant case. Apart from reducing the package size this also reduces the time required to apply the update on a real flash device since the redundant erase/reprogram cycle will typically take of the order of one second—even though no data has changed. In addition, the final COPY in block 3 is redundant as the decoder can implicitly add such a COPY operation if the explicitly supplied operations account for less than the total length of the block being updated.

Thus, upon inspection, it becomes evident that some operations can be eliminated to gain efficiency without affecting the resulting update. A simplified update package with the redundant and unnecessary operations removed is shown below in Sample Instruction Set No. 4.

| Sample instruction set No. 4 | |
| --- | --- |
| Block 1 | SETBLOCK 1 |
|  | COPY 2 @ 22 |
|  | ADD  1 {00} |
|  | COPY 2 @ 0 |
| Block 2 | SETBLOCK 2 |
|  | ADD  3 {03, 04, 05} |
|  | COPY 2 @ 5 |
| Block 3 | SETBLOCK 3 |
|  | ADD  2 {08, 09} |
|  | COPY 2 @ 10 |
| Block 5 | SETBLOCK 5 |
|  | COPY 3 @ 12 |
|  | ADD  2 {30, 31} |

Specifically, the last operation relating to block 3 (COPY 1 @ 14) can be added implicitly by the update decoder and thus the instruction can be removed. And more obviously, the operations relating to Block 4 can be removed entirely, as the instructions are to copy the same code from and to its current location.

And in a final set of examples, it can be shown how the use of the SETBLOCK operation can generate opportunities for efficiency by allowing updating across blocks in an order other than sequentially up the address range. In this last example shown immediately below as Sample Instruction Set No. 5, the SETBLOCK operation is used to update the blocks in reverse order.

| Sample Instruction Set No. 5 | |
| --- | --- |
| Block 5 | SETBLOCK 5 |
| | COPY 2 @ 10 |
| | COPY 1 @ 14 |
| | ADD  2 {30, 31} |
| Block 4 | SETBLOCK 4 |
| | COPY 5 @ 15 |
| Block 3 | SETBLOCK 3 |
| | COPY 2 @ 7 |
| | COPY 3 @ 20 |
| Block 2 | SETBLOCK 2 |
| | COPY 3 @ 2 |
| | COPY 2 @ 5 |
| Block 1 | SETBLOCK 1 |
| | ADD  3 {23, 24, 00} |
| | COPY 2 @ 0 |

As in Sample Instruction Set No. 4 above, block 4 can be removed from the package. Also evident now, there are only 2 ADD operations, as opposed to the 4 required when updating the blocks in sequential bottom-up order (see Sample Instruction Set No. 4 above). This occurs because a relatively large block of data in the image (the first 12 bytes) has moved up the image (i.e. to a higher offset). This region of the update can now be expressed as simple copies since each block update no longer overwrites source data required for the next block.

However, updating block 1 becomes more expensive since the source data that it made use of in the previous update order has now been destroyed by the time block 1 is updated. Simplified to eliminate unnecessary operations, final Sample Instruction Set No. 6 below shows the minimized operation applicable to the reverse order updating.

| Sample instruction set No. 6 | |
| --- | --- |
| Block 5 | SETBLOCK 5 |
| | COPY 2 @ 10 |
| | COPY 1 @ 14 |
| | ADD  2 {30, 31} |
| Block 3 | SETBLOCK 3 |
| | COPY 2 @ 7 |
| | COPY 3 @ 20 |
| Block 2 | SETBLOCK 2 |
| | COPY 3 @ 2 |
| | COPY 2 @ 5 |
| Block 1 | SETBLOCK 1 |
| | ADD  3 {23, 24, 00} |
| | COPY 2 @ 0 |

Now, with the foregoing sample instruction sets in mind relating to sample images 820 and 822, an indication of actual instruction set size and hence update package size can be obtained and compared. Generally assume all COPY and SETBLOCK operations can be encoded in a single byte and that ADD operations require 1 byte for the operation itself and 1 each for each byte being added. In this very simplistic encoding we see that the original instruction set of Sample Instruction Set No. 1 has size 11, whereas sample set No. 2 has size 19. This is the expected increase due to bifurcated operations occurring at block boundaries. It is seen though that among the remaining examples, Sample Instruction Set No. 4 has size 21, and the last, Sample Instruction Set No. 6, has size 18. Thus the update-in-place packages tend to be larger than the non-update-in-place version, but the order in which blocks are updated is important. In fact, the size of instruction set No. 6 for reverse order updating, including the SETBLOCK operations, is smaller than the forward updating process of sample instruction set No. 2 which does not even have SETBLOCK operation. Thus, the addition of SETBLOCK operation still resulted in a net size reduction in the instruction set. In practice the difference in size between these two differing block update orders is commonly in excess of 50%. Note also that for real image data the overhead of the SETBLOCK operations is completely negligible due to the (typically) 64 KB block size as against the 5 byte block size used here.

Encoding using SETBLOCK operations can be used to update flash blocks in the image in any order without modification to the update decoder. If the update block order was chosen correctly then the package size can be reduced by virtue of minimizing the amount of data overwritten before being able to be used as the source of a COPY operation. Also, importantly, through the use of the SETBLOCK operation, the pool of copy sources is not necessarily fixed, since a different order of updating of memory blocks generates a different set of available block images (both old and new) for use in COPY operations.

A final important point is that although one or other of the two block update orders used in the above examples (sequentially bottom-up, or top-down) commonly gives good results, there are cases where completely different update orders are preferable. In the above cases it is assumed that the BDE simply generates packages using both orders and uses the smaller one, however it isn't feasible to generate packages for every possible update order where there might be a few tens up to a few hundred blocks to update—the processing time required becomes prohibitive. Thus further analysis by the BDE is required to determine if such a non-sequential update order would be the best. However the SETBLOCK operation discussed here allows such non-sequential block update orders to be expressed in the update package and applied by the package decoder with no further modifications.

One further size optimisation can be made to the update package encoding with a minor addition to the decoder on the device. If the last instruction prior to a SETBLOCK is a COPY from the same location in the source image then the COPY instruction can be discarded entirely, provided that the decoder detects blocks where the update instructions do not reach the end of the block, and inserts an appropriate implicit COPY instruction itself.

Secure Restart After Loss of Power

Making the application of the update package secure against power failure requires a copy of the block X being reprogrammed to be taken and flashed into a pre-allocated scratch block 232 prior to erasing the original block X. One of the benefits of flash ROM over previous forms of non-volatile memories is the high number of rewrites possible that makes this a possibility without appreciable deterioration of the memory device itself. Such power failure recovery also requires additional non-volatile state information, as discussed below. The above decoder procedure can be modified to cope with rebuilding the current block after a power failure immediately following the erase of the original block, by detecting any COPY operation whose source falls in the 'current' block and taking the source data from the scratch block 232. If the copy of original block X is made early enough to the scratch block 232, before the update starts to build the replacement content, the identical algorithm can be used for all blocks independent of whether the content of the actual current block in the image is valid or not (i.e. irrespective of whether a power failure has occurred). This is possible provided that the source of a single COPY operation can never cross into, or out of, the current block. The modifications above for the in-situ update package generation, if taken in full, do guarantee this.

Use of Status Bit Array

Figure 9:
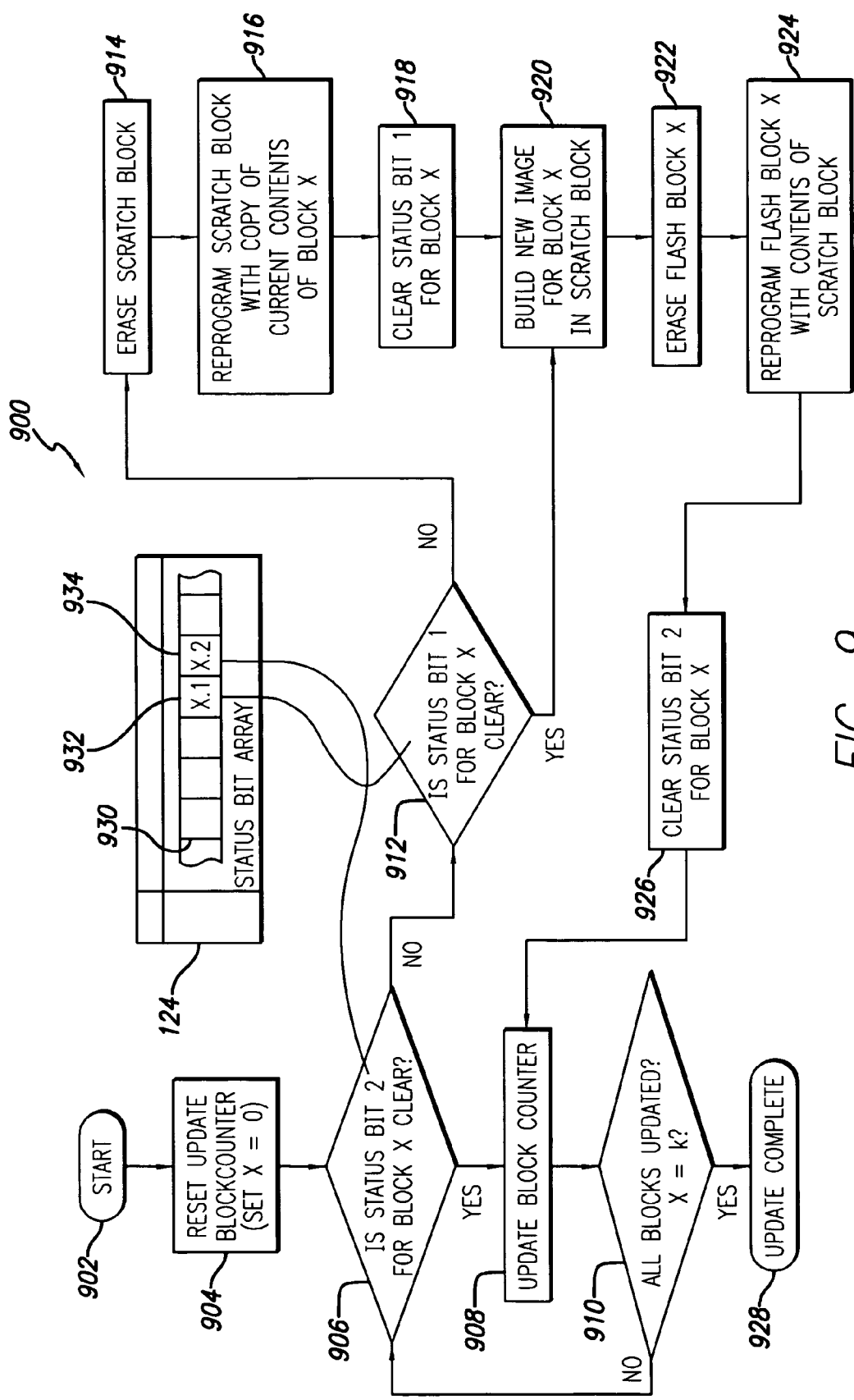
FIG. 9 is a flowchart illustrating one embodiment of the present invention incorporating update restart.

FIG. 9 illustrates an installation process 900 for applying an update package 124 generated in accordance with one embodiment of the invention, wherein the update package incorporates a status bit array 930 comprised of at least 2 additional status bits 932 and 934 for and associated with each memory block X of the k memory blocks to be updated, thereby enabling the restart and continuation the update process should it be interrupted prior to completion, whether by power failure, user override or other reasons. It will be noted that the steps of FIG. 9 have several similarities to those described in the embodiment shown in FIG. 4. However, so as to allow focus on the process features of the embodiment of FIG. 9 relating to the status bit array 930, certain generic steps of FIG. 4, such as states 404, 406, 408, 410, 412 and 430 have not been reproduced, though it would be evident to one skilled in the art how these steps could be incorporated with the process depicted in FIG. 9.

In any event, the process for applying the update package 124 commences at a start state 902 where a client device 150 having a first original image 120 programmed across k blocks of a block structured non-volatile memory device 210 is to have such original image reprogrammed with a new image 122. As will be explained further below, start state 902 may be at a point when an update package 124 is first received and to be installed, or alternatively, when an update package to be applied has been previously received and installation is to re-commence after being interrupted at some point prior to complete installation of the update package. Thus, in either scenario, it is assumed that an update package has already been received and saved to some a location, such as in a data memory block in space 230 of non-volatile memory device 210 on the client device 150 and any authentication or document integrity checking of the update package 124, perhaps analogous to steps 404, 406 and/or 408 has occurred, if it was desirable to do so.

From start state 902, the process initiates by, at step 904, setting or resetting an update block counter 254 to zero or some other predetermined value that can be meaningful used in conjunction with a counting mechanism used when encoding the update package and update instruction set. The upgrade package 124 must contain a count of the number of k memory blocks 220 that will be updated. In the present embodiment, the update package 124 contains an array of status bits 930 that maintains a record of the state of each block to be updated. Each block to be updated, X, has a first status bit 932 and second status bit 934 associated therewith. These bits are generically referenced as X.1 and X.2, respectively. There is a logical mapping that correlates the actual target block to be updated within the non-volatile memory device 210 with each such block listed in the update package 124 as requiring updating, however the specific nature of this mapping function is unimportant to the implementation of the method being described and numerous alternative are available and evident to one skilled in the art.

The first status bit, X.1, 932 for which there is one for each of the k blocks to be updated, correlates to confirming whether the updating process has achieved the intermediary step of erasing the non-volatile scratch block 232 and storing a copy of the current contents of such Xth block therein. The second status bit, X.2, 934 for which there is one for each of the k blocks to be updated, correlates to confirming or denying whether the instant Xth block has been already applied, i.e., the Xth block has been reprogrammed with the new image therfore.

All status bits begin in a first or set state when the update package is first stored on the device and act as switchable status identifiers during the process of updating. By definition these status bits will themselves be present in flash memory (but in a block not in the k blocks to be updated) by virtue of storing the update package after its initial receipt by the client device. Flash memory cells cannot be rewritten with new data without first erasing them, however with the exception that any flash memory cell storing a "1" can be programmed to "0". Accordingly, in the present case each of the block status bits are set to 1 in the upgrade package as initially delivered and stored on the device constituting a first or initial set state for each status bit. Thus, these bits will be updated or switched to a second state when cleared to "0" in-situ during application of the upgrade package.

Certain flash chip architectures may require each status 'bit' to be represented in a more complex fashion. Intel Strata Flash devices for example require use of 2 physical bits per logical bit, where both bits set represents the logical state set, and any other combination signifies the logical state clear. Both physical bits need to be cleared in the same write operation to the bit array. This representation retains the required behavior in terms of update the status bits, its only impact on the method is the increase in the size of the status bit array 930.

Storage of the status bit array 930 in the update package itself has the additional advantage that the code applying the update on the target device is not concerned with allocation or initialization of the array; provided sufficient non-volatile memory is available to store the update package, no further checks or preparation are required. This reduces both the complexity and size of the update agent. Note that even for a relatively large 16 MB flash device divided into uniform 64 KB blocks, the entire status array occupies only 32 bytes and thus its inclusion in the update package imposes no significant size penalty on the package itself.

Continuing, after step 904, query state 906 is reached and the second status bit 934, X.2, for the first of k blocks, is checked. If during the query state 906 it is confirmed that the second status bit is still set (i.e., is still a "1"), then the current block has not been reprogrammed and the update process moves to query state 912. At step 912 the first status bit 932, X.1, is checked. If it is still set (i.e., a "1"), then this indicates that the original contents of block X have not been copied to the scratch block 232. In this situation, the process moves sequentially through steps 914 to 918 where the scratch block 232 is erased, the original contents of block X are copied into the scratch block, and then first status bit 932, X.1, is cleared. A single reserved scratch flash block 232 is required for use during application of the update. For flash devices where the block geometry includes blocks of different sizes this scratch block must be as large as the largest block actually modified by the upgrade. The update method can in fact be implemented provided one or more scratch flash blocks are available that together have a total size as large as, or larger than, the single largest block that is to be updated. The update agent that implements the method must simply be modified to consider the multiple scratch blocks to be a single scratch area for the purposes of the method. Supporting a 'virtual' scratch block split over more than one physical block in this way will slightly increase the complexity of the update agent, but has no impact of the method since it imposes no constraints on the erase and/or write operations in the scratch block. After the first status bit is cleared at step 918, the new image contents of block X are constructed in RAM at 920, block X itself is erased at 922 and reprogrammed with the new content from RAM at 924, and second status bit 934, X.2, is cleared at 926.

This completes the cycle of updating the instant block X, so the process 900 updates the block counter at 908 and queries whether all blocks have been updated according to the block counter at step 910. If all blocks have been updated, the process moves to completion state 928. However, in the event all blocks have not been updated, the process returns to 906 and a normal upgrade proceeds by updating each block in turn. It continues by checking status bits 934 and 932 for each successive X block of the k blocks to be updated (steps 906, 912), and successively copying the original content of each block X to the scratch block, building the target block's new content in RAM, reprogramming the target block from the new content in RAM (steps 914–924), and clearing status bits 932 and 934 at steps 918 and 926, respectively. Clearing of status bits associated with each block can be done without an erase/reprogram cycle given the properties of flash memory devices described above. Update of the status bits in a conventional NOR flash device for example requires reading of the byte that contains the status bit to be cleared, the appropriate bit cleared in the value so read, and the resulting value written back to the same location in the flash device; this update has the required behavior for the method as described. The above block update procedure is repeated, incrementing the update block counter accordingly, until all blocks have been updated, at which point the upgrade is complete.

As may already be evident from inspection of update process 900, it is possible to restart the upgrade procedure following loss of power (or other interruption) during a previous upgrade attempt. The procedure re-starts from the first block as for the normal procedure, but due to one or more status bits having been cleared in the previous update attempt the process has a modified effect as described below.

For example, if at the outset of reaching query step 906 (perhaps in restarting the update process after an interrupt or power loss during a previous update attempt), a cleared second status bit is encountered, the process would move directly to step 908 to increment the update counter 254 and then verify at 910 if all blocks were updated. The process continues to return to step 906 and update counter block 254 at 908 until it is confirmed that all blocks are updated at step 910, or a second status bit is encountered at step 906 that is still set with respect to an Xth block of the k memory blocks to update. In this event, it next proceeds to step 912. If at step 912 it was determined first status bit, X.1, was already clear, this would indicate that the original content of the current Xth block was already saved in the scratch block; in which case the process proceeds to step 920 to construct the new content for block X in RAM, erase block X itself, and reprogram such block with the new content constructed in RAM at 924, and finally update, i.e., clear the second status bit, X.2, for the current block. This cycle would continue until second status bit was encountered at step 906 that was still set, which would send the process over to update the subject Xth block beginning at 912.

What is claimed is:

1. An updating system for transforming a first data image into a second data image, wherein said first image resides across k memory blocks of a block-structured non-volatile memory device contained in a client device, said updating system comprising:
    an update generator that produces an update package resulting from a comparison between the first data image and the second data image whereby said comparison selects and encodes an instruction set comprising a plurality of SETBLOCK, COPY and ADD operations for each of the k memory block; and
    an update decoder resident on the client device, whereby said update decoder interprets the instruction set of the update package and applies the update package to update the k memory block;
    wherein the SETBLOCK operations identify specific operations applicable to specific memory blocks and facilitate memory block updating in a non-sequential manner;
    wherein said update package further includes a status array comprised of at least two switchable status identifiers associated with each memory block X of k to be updated as instructed by the instruction set contained in the update package.

2. An updating system for transforming a first data image into a second data image, wherein said first image resides across k memory blocks of a block-structured non-volatile memory device contained in a client device, said updating system comprising:
    an update generator that produces an update package resulting from a comparison between the first data image and the second data image whereby said comparison selects and encodes an instruction set comprising a plurality of SETBLOCK, COPY and ADD operations for each of the k memory blocks; and
    an update decoder resident on the client device, whereby said update decoder interprets the instruction set of the update package and applies the update package to update the k memory blocks;
    wherein the SETBLOCK operations identify specific operations applicable to specific memory blocks and facilitate memory block updating in a non-sequential manner;
    wherein for each memory block X of k blocks an undated version of such Xth memory block is first constructed in a scratch memory, and then memory block X is reprogrammed with the contents of the scratch memory;
    wherein said update decoder maintains at least two copy-offset values comprised of a current offset value and a non-current offset value, and wherein the instruction set of said update package further comprises a plurality of SETCOPYOFFSET operations, which SETCOPY-OFFSET instructions instruct the update decoder to toggle the copy-offset value between the current value and the non-current value.

3. The system of claim 2, wherein said update decoder further comprises a mode mechanism that switches the update decoder from using the copy-offset value to using a zero offset.

4. A method of updating to a second image a first image stored across k memory blocks of a non-volatile memory device contained in a client device, said updating method comprising:
    Generating an update package by comparing the first image and the second image and using result of said comparison to encode an instruction set comprised of a plurality of SETBLOCK, COPY and ADD operations for each of the k memory blocks;

Applying the instruction set by interpreting the instruction set to direct the updating of the memory blocks in an order specified by the SETBLOCK operations, wherein the SETBLOCK operations facilitate memory block updating in a non-sequential manner;

Constructing an updated version of each Xth memory block in a scratch memory location accessible to the client device wherein said scratch memory location is at least as large as the largest of the k memory blocks;

Reprogramming a temporary memory block in a non-volatile memory device with the contents of the scratch memory;

Switching a first switchable status identifier when said memory block reprogramming is completed with respect to each memory block;

Reprogramming the Xth memory block with the contents of the temporary memory block; and Switching a second switchable status identifier when said Xth memory block reprogramming is completed with respect to each memory block.

5. The method of claim 4 further comprising:

Checking the second status identifier for each Xth block;

Then for the first block encountered for which such second status identifier is still set, checking the first status identifier with respect to such; and Proceeding to update such block commencing from the Xth memory block reprogramming if said first status identifier is clear, or proceeding to update the subsequent block X+1 commencing at the undated block constructing.

6. A system for reliably updating on a client device a first image stored across a plurality of memory blocks of a non-volatile memory device to create a second image, said system comprising:

a. an update package including an instruction set, which instruction set comprises a plurality of ADD and COPY operations associated with each of the plurality of memory blocks to be updated;

b. a status array comprised of a least two switchable status identifiers associated with each of the plurality of memory blocks, wherein one X block of k blocks to be updated as instructed by the instruction set is contained in the update package; and c. an update decoder resident on said client device that interprets the update package and applies the instruction set to update the plurality of blocks on a block-by-block basis, and which update decoder accesses and manipulates the status identifiers when applying said instruction set;

wherein said at least two switchable status identifiers are configured to facilitate restarting update processing if said update processing is interrupted.

7. The system of claim 5 further comprising a status array of at least first and second switchable status identifiers associated with each Xth memory block of k to be updated, whereby the first switchable status identifier is switched from a first state to a second state when the contents of the scratch memory are stored in a temporary memory block in a non-volatile memory device prior to said contents being reprogrammed into the Xth memory block, and whereby the second switchable status identifier is switched from a first state to a second state when the updated code is reprogrammed into the Xth memory block from said temporary memory device rather than with the contents of the scratch memory.

8. The system of claim 6 wherein said status array is comprised in the update package.

9. The system of claim 8 wherein the instruction set further comprises a plurality of SETBLOCK operations, at least one each associated with each of the plurality of memory blocks to be updated.

* * * * *